United States Patent [19]

Riegger et al.

[11] B 3,925,424

[45] Dec. 9, 1975

[54] PROCESS FOR PREPARING 4-CHLOROFORMYL PHTHALIC ACID ANHYDRIDE

[76] Inventors: Paul Riegger, Augustiner Str. 1, 521 Troisdorf-Sieglar; Hermann Richtzenhain, 5066 Schwellenbach/Post Marialinden, both of Germany

[22] Filed: Mar. 8, 1972

[21] Appl. No.: 233,383

[44] Published under the Trial Voluntary Protest Program on January 28, 1975 as document no. B 233,383.

[52] U.S. Cl. ............................................. 260/346.3
[51] Int. Cl. ........................................ C07D 307/89
[58] Field of Search ..................... 260/346.3, 544 M

[56] References Cited
UNITED STATES PATENTS

| | | | |
|---|---|---|---|
| 1,557,154 | 10/1925 | George | 260/544 |
| 1,963,748 | 6/1934 | Kyrides | 260/544 |
| 3,691,217 | 9/1972 | McCann | 260/544 |

*Primary Examiner*—Henry R. Jiles
*Attorney, Agent, or Firm*—Ralph D. Dinklage

[57] ABSTRACT

A method for preparing 4-chloroformyl phthalic acid anhydride which comprises contacting a trimellitic acid anhydride with an aromatic trichloromethyl compound of the formula:

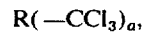

$$R(-CCl_3)_a,$$

wherein R represents a mono- or polynuclear aromatic radical and $a$ is a number from 1 to 6 in the presence of a catalyst.

10 Claims, No Drawings

PROCESS FOR PREPARING 4-CHLOROFORMYL PHTHALIC ACID ANHYDRIDE

BACKGROUND OF THE INVENTION

1. Field of the Invention

This invention relates to the preparation of 4-chloroformyl phthalic acid anhydride. More particularly, this invention is directed to a method of preparing 4-chloroformyl phthalic acid anhydride from a chloromethyl substituted aromatic compound and trimellitic acid anhydride. This invention is also directed to the preparation of the same from such organic compounds using a Lewis acid catalyst as a catalyst therefor.

2. Discussion of the Prior Art 4-chloroformyl phthalic acid anhydride is of special importance, particularly in the preparation of special polyesters, polyamides, and polyimides. Also, it can be used in the preparation of special plasticizers.

In conventional processes, 4-chloroformyl phthalic acid anhydride is produced, as is known, by reacting trimellitic acid anhydride with thionyl chloride. This method is described, for instance, in J. Chem. Soc. (1964), pp. 3,475–3,477. In a modified mode of preparation, trimellitic acid is utilized in place of trimellitic acid anhydride. The drawback of both of these known methods consists in that, in addition to hydrogen chloride, considerable quantities of sulfur dioxide are produced which, in most cases, is not only useless, but requires considerable expense for its elimination. Moreover, the reaction of the trimellitic acid anhydride or the trimellitic acid, both of which are poorly soluble in thionyl chloride, proceeds only slowly. Hence, both processes are uneconomical.

It is known in the art to react carboxyl groups with trichloromethyl groups, linked to an aromatic radical, in the presence of catalysts of the type of the Lewis acids. In this process, hydrogen chloride is formed, and an aromatic acid chloride and the acid chloride of the acid that originally contained the reacted carboxyl group result.

It is further known to react acid anhydride groups with trichloromethyl groups, linked to aromatic radicals, in the presence of the aforementioned catalysts. In this way, according to P. Kyrides, Journ. Am. Chem. Soc. 59 (1937), p. 206, phthaloyl chloride is, for instance, formed at a high yield in addition to benzoyl chloride from phthalic acid anhydride and benzotrichloride in the presence of $ZnCl_2$ at 110°–120°C.

OBJECTS OF THE INVENTION

It is an object of the invention to produce 4-chloroformyl phthalic acid anhydride of as pure a form as possible in an economical manner, without requiring long reaction times or expensive working-up procedures.

SUMMARY OF THE INVENTION

Broadly, this invention contemplates a process for preparing a 4-chloroformyl phthalic acid anhydride which comprises contacting a trimellitic acid anhydride with an aromatic trichloromethyl compound, in the presence of a catalyst, said aromatic trichloromethyl compound having the formula:

$$R(-CCl_3)_a,$$

wherein R represents a mono- or polynuclear aromatic radical and $a$ is a number from 1 to 6.

In a particularly desirable embodiment, this invention contemplates a process of preparing 4-chloroformyl phthalic acid anhydride which comprises contacting trimellitic acid anhydride with such an aromatic trichloromethyl compound wherein R is a mononuclear aromatic radical and $a$ is an integer not greater than 2. The reaction takes place in the presence of a Lewis acid and in the additional presence of an inert organic solvent at a temperature between 80° and 200°C.

It has been found, in accordance with the present invention, that a simple, inexpensive and relatively rapid method of preparing 4-chloroformyl phthalic acid anhydride is provided by utilizing as a reactant an aromatic trichloromethyl compound of the type described. The process does not involve utilization, necessarily, of a sulfur-containing compound, and hence, problems attendant upon the in situ production of sulfur dioxide do not arise. The present process can be carried out at temperatures of 80° to 200°C, preferably between 110° and 150°C. During the reaction, which can be suitably carried out in the presence of an inert organic solvent, if desired, hydrogen chloride is produced in addition to an organic acid chloride. The process of the present invention is preferably carried out in the presence of a catalyst, especially a Lewis acid. The catalyst is present in an amount between about 0.01 and 1 weight percent based on the weight of the trimellitic acid anhydride reactant. It should be understood, however, that higher concentrations of catalyst can be used. However, such higher concentrations of catalyst do not provide appreciable benefits.

Generally speaking, the amount of aromatic trichloromethyl compound employed depends upon the number of free carboxyl groups with which such compound is to react. Thus, it is possible to react a mixture of trimellitic acid anhydride with other organic anhydrides having more than 1 free carboxyl group. If both of such carboxyl groups are to be reacted, in accordance with the invention, more trichloromethyl organic compound is required. The trimellitic acid anhydride of the present invention can be a substituted acid anhydride wherein there is substitution on the aromatic nucleus. Substitution substituents can include alkyl, aryl, alkenyl, and the like, all of which can, in turn, be substituted. Substituents pendent from such organic nucleus include the following groups; halides, especially chloride; nitrates; phosphates; sulfonates; amines; borates; sulfonyl; organic oxygen containing radicals, such as acetyl, and the like. Similarly, the organic aromatic radical of the trichloromethyl compound can have substituents on the ring. Such substituents can include those listed above in respect of the trimellitic acid anhydride reactant. It should be understood that the aromatic radical which forms a part of the trichloromethyl group can be phenyl, naphthyl, anthracyl, and phenanthryl. Similarly, the organic radical can be a compound in which two or more aryl groups are bonded together at a single carbon atom, e.g., diphenyl.

DESCRIPTION OF THE PREFERRED EMBODIMENTS

Surprisingly, it has been found that by heating a mixture of a trimellitic acid anhydride compound with an aromatic compound which contains at least one trichloromethyl group on the aromatic nucleus, in the presence of a Lewis acid, a reaction takes place of the free carboxyl group of the trimellitic acid anhydride compound with a trichloromethyl group of the aromatic compound. However, the acid anhydride group is conserved, i.e., remains unchanged.

Thus, the invention relates to a process for preparing 4-chloroformyl phthalic acid anhydride by reaction of a trimellitic acid anhydride with an aromatic trichloromethyl compound of the general formula $$R(-CCl_3)_a,$$

wherein R represents a mono- or polynuclear aromatic radical substituted if desired, and $a$ is a number from 1 to 6, preferably 1 or 2, in the presence of a catalyst and, if desired, in the presence of inert organic solvents at temperatures of 80° to 200°C., preferably 110° to 150°C. Hydrogen chloride splits off during the reaction in a quantity corresponding to the number of trichloromethyl groups reacting with free carboxyl groups of the trimellitic acid anhydride.

The reaction on which the process according to the invention is based proceeds according to the following chemical equation:

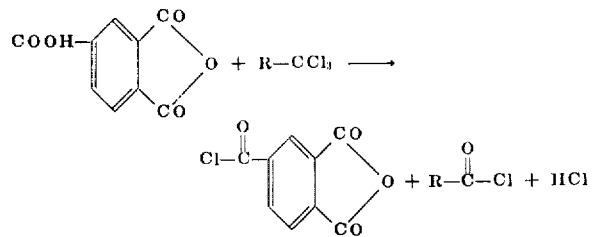

In this equation also, R represents the above defined aromatic radical.

The following substances can, for instance, be utilized as aromatic trichloromethyl compound of the general formula given above: benzotrichloride, its substitution products such as 4-chloro or 2,4-dichlorobenzotrichloride, 1,4- or 1,3-bis-(trichloromethyl)-benzene, 1,3,5-tri-(trichloromethyl) benzene and the respective substitution products of the last named substances. As trichloromethyl compounds, preferably benzotrichloride and 1,4-bis-(trichloromethyl) benzene are utilized in the process according to the invention. The latter substance can be easily produced analogous to 1,3-bis-(trichloromethyl) benzene by chlorinating the appropriate xylene (in the first case: p-xylene; in the last case: m-xylene). If compounds having several aromatically linked trichloromethyl groups are utilized, such as e.g., bis-(trichloromethyl) benzene, only half a mole of the trichloromethyl compound has to be employed per mole of trimellitic acid anhydride. As regards the reaction according to the invention, approximately one trichloromethyl group has to be utilized for each carboxyl group. Excess trichloromethyl compound, e.g., 10 percent by weight excess, can be conveniently used.

As catalysts for the process according to the invention, Lewis acids such as, e.g., zinc chloride, ferric chloride, aluminum chloride, titanium tetrachloride, zirconium tetrachloride and boron fluoride can be employed. Preferred are zinc chloride and iron chloride. Hydrogen containing Lewis acids can be used, such as HF, $H_2SO_4$ and $H_3PO_4$. Additionally, $P_2O_5$ can be utilized. According to the invention, the concentration of the catalysts can vary within the range of about 0.01 to about 1 percent by weight, based on the weight of the trimellitic acid anhydride reactant.

The reaction according to the process of the invention starts in the presence of ferric chloride at a temperature as low as 90°C. At temperatures of 120°C. and more, the reaction proceeds to its completion quickly and with brisk evolution of hydrogen chloride. When zinc chloride and other catalysts are utilized, a reaction temperature of 140°C. to 200°C. is necessary.

In many cases the reaction according to the invention proceeds very violently and with strong evolution of hydrogen chloride. Difficulties of this type can occur especially in large-scale industrial batches. These difficulties can be eliminated by a preferred embodiment of the present invention which consists of introducing the trimellitic acid anhydride successively, gradually or by batches (i.e., in partial portions) into the prepared molten trichloromethyl compound.

Another preferred embodiment of the invention involves dissolving the trimellitic acid anhydride reactant in the acid chloride, which, in the course of the reaction, is formed from reaction of the trichloromethyl compound and the trimellitic acid anhydride. This resultant solution is added to the prepared trichloromethyl compound. Essentially, any inert organic solvent can be used for this purpose, provided that its boiling point is sufficiently high. In some cases it may be of advantage with respect to these specific methods to add the catalyst totally or partially to the trimellitic acid anhydride.

The working-up of the reaction mixture obtained by the process according to the invention is realized in the usual manner by fractional distillation. The process according to the invention can be carried out both batchwise and continuously.

Compared to the known methods of preparation, the process according to the invention has a whole series of advantages. The yields are excellent. The 4-chloroformyl phthalic acid anhydride is obtained in a degree of high purity. However, in addition to the main product, acid chlorides, such as benzoyl chloride, chlorobenzoyl chloride, tere- or isophthaloyl chloride are obtained as side products. It is known that these substances are important intermediate products. The process according to the invention works especially economically, particularly since the reaction speed is relatively high as compared to the known processes.

EXAMPLES

Example 1

192 g (1 mole) of coarsely crushed trimellitic acid anhydride are added by portions to 156.5 g. (0.5 moles) of 1,4-bis-(trichloromethyl) benzene, which was mixed with 0.2 g of ferric chloride, within 20 minutes while stirring at 120°C. One mole of hydrogen chloride escaped. The distillation of the reaction product at 0.2 torr yielded 199 g of terephthalic acid dichloride ($bp_{0.2}$ 85°–86° C) and 209 g of 4-chloroformyl phthalic acid anhydride ($bp_{0.2}$ 137°C). The distillation residue was 2 g.

EXAMPLE 2

As in Example 1, 39.1 g (0.2 mole) of benzotrichloride were reacted with 38.4 g (0.2 mole) of trimellitic acid anhydride at 120° C. in 20 minutes. In the vacuum distillation, 28 g of benzoyl chloride and 42 g of 4- chloroformyl phthalic acid anhydride were obtained. The residue was 0.2 g.

Example 3

31.3 g (0.1 mole) of 1,4-bis-(trichloromethyl) benzene, 38.4 g (0.2 mole) of trimellitic acid anhydride and 0.01 g of ferric chloride were filled into a flask. Moreover, terephthalic acid dichloride was added as solvent in a quantity of 20 g. The reaction mixture obtained in this manner was melted and heated to 120°C. within 30 minutes while stirring. 0.2 mole of hydrogen chloride escaped. The distillation yielded 40 g of terephthalic acid dichloride and 42 g of 4-chloroformyl phthalic acid anhydride. The residue amounted to 0.4 g (0.64 percent by weight). Yield: approximately 99 percent.

Example 4

38.4 g (0.2 mole) of trimellitic acid anhydride were added at 140°C. over a period of 40 minutes, while stirring, to a mixture of 31.3 g (0.1 mole of 1,3-bis-(trichloromethyl) benzene and 0.8 g of zinc chloride. 0.187 mole of hydrogen chloride was split off. The batch distilled nearly without residue at 0.4 torr in the range of 115°–140° C. and had the the following composition: 41.4 percent by weight of isophthalic acid dichloride, 57.3 percent by weight of 4-chloroformyl phthalic acid anhydride, 1 percent by weight of trichloromethyl-m-benzoyl chloride, and 0.3 percent by weight of hexachloro-m-xylene.

What is claimed is:

1. A method for preparing a 4-chloroformyl phthalic acid anhydride which comprises contacting a trimellitic acid anhydride with an aromatic trichloromethyl compound of the formula:

$$R(-CCl_3)_a,$$

wherein R represents a mono- or polynuclear aromatic radical and $a$ is a number from 1 to 6 in the presence of ferric chloride, at 80° to 200°C.

2. A process according to claim 1 wherein R is a mononuclear aromatic radical.

3. A process according to claim 1 wherein $a$ is an integer not greater than 2.

4. A process according to claim 1 wherein said temperature is between 110° and 150°C.

5. A process according to claim 1 wherein the ferric chloride is present in an amount between about 0.01 and 1 weight percent based on the weight of the trimellitic acid anhydride reactant.

6. A process according to claim 3 wherein trimellitic acid anhydride is reacted with 1,4-bis-(trichloromethyl) benzene.

7. A process according to claim 3 wherein benzotrichloride is contacted with trimellitic acid anhydride.

8. A process according to claim 1 wherein the reaction is carried out in the presence of terephthalic acid dichloride as solvent.

9. A process according to claim 1 wherein $a$ is 2.

10. A process according to claim 1 wherein said aromatic trichloromethyl compound is selected from the group consisting of 1,4-bis-(trichloromethyl)-benzene, 1,3-bis-(trichloromethyl)-benzene, and 1,3,5-tri-(trichloromethyl) benzene.

* * * * *